United States Patent [19]

Yuri et al.

[11] Patent Number: 4,974,716

[45] Date of Patent: Dec. 4, 1990

[54] DEVICE FOR FEEDING CAN BARRELS

[75] Inventors: Haruyuki Yuri, Kazo; Isao Ibane, Tatebayashi; Seiji Kumagai, Sapporo, all of Japan

[73] Assignee: Hokkai Can Co., Ltd., Tokyo, Japan

[21] Appl. No.: 340,703

[22] Filed: Apr. 20, 1989

Related U.S. Application Data

[63] Continuation-in-part of Ser. No. 109,311, Oct. 19, 1987, Pat. No. 4,830,169.

[30] Foreign Application Priority Data

Aug. 30, 1988 [JP] Japan .................................. 112777[U]

[51] Int. Cl.$^5$ ............................................ B65G 47/00
[52] U.S. Cl. ..................................... 198/345; 198/377; 198/471.1; 118/319
[58] Field of Search ............... 198/344, 345, 377, 378, 198/471.1, 472.1, 463.4, 463.6, 531, 532; 101/40, 40.1; 118/319, 46, 230

[56] References Cited

U.S. PATENT DOCUMENTS

| | | | |
|---|---|---|---|
| 2,424,581 | 7/1947 | Peters | 198/344 X |
| 2,818,159 | 12/1957 | Yeo et al. | 198/394 X |
| 3,238,908 | 3/1966 | Gilbert | 198/377 X |
| 3,267,842 | 8/1966 | Resnick et al. | 101/40 |
| 3,362,520 | 1/1968 | Rudolph et al. | 198/378 |
| 3,524,429 | 8/1970 | Wilding | 198/344 X |
| 4,240,373 | 12/1980 | Anger | 118/319 X |
| 4,246,300 | 1/1981 | Jensen | 198/344 X |
| 4,428,474 | 1/1984 | Gau et al. | 198/377 X |
| 4,442,934 | 4/1984 | Dorf et al. | 198/344 |
| 4,671,093 | 6/1987 | Dominico et al. | 101/40.1 X |
| 4,830,169 | 5/1989 | Nariki et al. | 198/345 |

*Primary Examiner*—H. Grant Skaggs
*Assistant Examiner*—Cheryl L. Gastineau

[57] ABSTRACT

A plurality of rotatable attracting units are mounted on a rotary member each for attracting the bottom of one can barrel supplied from a supply path in a first position. Each of the attracting units is inactivatable to release the can barrel onto a conveyor path in a second position after the can barrel has been rotated by the rotary member through a prescribed angle from the first position to the second position. A holder is disposed for holding in the first position the can barrels, one at a time, supplied from the supply path while centrally aligning the bottom of the can barrel with the center of rotation of the attracting unit. The holder includes, in the first position below the the supply path, a rotary body having a plurality of recessed defined in an outer periphery thereof each for supporting a side of a can barrel supplied from the supply path, and a drive device for intermittently rotating the rotary body in synchronism with the rotary member. The radius of a circle along which the can barrels supported by the recesses of the rotary body are rotated by the rotary body is smaller than the radius of a circle along which the can barrels attracted by the attracting units are rotated by the rotary member.

3 Claims, 6 Drawing Sheets

DEVICE FOR FEEDING CAN BARRELS

This application is a continuation-in-part of application Ser. No. 0/109,311, filed on Oct. 19, 1987 now U.S. Pat. No. 4,830,169.

BACKGROUND OF THE INVENTION

1. Field of the Invention:

The present invention relates to a device for feeding can barrels such as bottomed can barrels for can containers with their axes lying horizontally while rotating them through a prescribed angle.

2. Description of the Prior Art:

One known device for feeding can barrels is disclosed in U.S. Pat. No. 4,246,300, for example.

As shown in FIGS. 6 and 7 of the accompanying drawings, can barrels a for can containers are supplied with their axes lying horizontally from a vertical supply path b into receiver slots d defined in a star wheel c as it rotates. The supplied can barrels a have their bottoms g attracted by respective attracting rollers f which are rotated by an endless belt e disposed behind the star wheel c and have respective suction holes f, coupled to a suction device (not shown). Upon rotation of the star wheel c, the can barrels a held horizontally by the attracting rollers f are successively angularly moved through a prescribed angle while being rotated about their own axes by the rotation of the attracting rollers f about their own axes. At each position S of the angular movement, pain is sprayed into the can barrels a to apply a paint coating to their inner surfaces. Then, the painted can barrel a is further rotated, and then released from the attracting roller f onto a feed conveyor h by which the can barrel a is delivered into a drying oven device (not shown) in which the applied paint coating is dried with heat.

When the bottom of the can barrel a is attracted to the attracting roller f, it is necessary to align the center of rotation of the attracting roller f with the center of rotation of the bottom of the can barrel a. For centering the can barrels a, the conventional device employs the star wheel c and has a side guide j having a guide surface m extending in concentric relation to the star wheel c which holds the can barrels a. The can barrel a is attracted to the attracting roller f only after the can barrel a is centered at the time it is held and rotated by the star wheel c at the terminal end of the supply path b.

It is also proposed to provide the attracting roller f with a centering boss (not shown) for fitting in a recess in the bottom of the can barrel a and to provide a top guide 1 for engaging the open end k of the can barrel a. The centering boss and the top guide 1 can accurately center the can barrels a with the attracting rollers f only in cooperation with the star wheel c and the side guide j.

With the disclosed conventional arrangement, the attracting roller f is rotating about its own axis when the can barrel a is supplied from the supply path b into the receiver slot d of the rotating star wheel c, centered with respect to the attracting roller f and attracted thereto. Therefore, before the bottom g of the can barrel a which is not rotated is attracted to the attracting roller f at a prescribed position thereon, the can barrel a may wobble out of centered alignment into a twisted shape. The can barrel a is centered while being gripped between the star wheel c and the side guide j. Consequently, when the can barrel a is rotated by the rotation of the attracting roller f about its own axis, the can barrel a tends to be damaged since its side i is held against the receiver slot d and the side guide j.

The can barrel a is also gripped between the attracting roller f and the top guide 1 with the open end k of the can barrel a being in contact with the top guide 1. Therefore, upon rotation of the can barrel a caused by the attracting roller f about its own axis, the open end k tends to be deformed by pressed engagement with the top guide 1.

If the side i of the can barrel a is damaged, the can barrel a has a poor appearance. If the open end k is damaged, it cannot smoothly be flanged at a later time.

SUMMARY OF THE INVENTION

In view of the aforesaid shortcomings of the conventional can barrel feeding device, it is an object of the present invention to provide a device for feeding can barrels quickly and reliably while rotating them with their axes lying horizontally, without damaging the sides and open ends thereof.

Another object of the present invention is to provide a device for feeding can barrels while rotating them with their axes lying horizontally, to a painting device for applying a paint coating to the inner surfaces of the can barrels.

To achieve the above objects, there is provided a device for feeding can barrels, comprising: a rotary member rotatable about its own axis; supply path means for supplying can barrels to said rotary member; a plurality of rotatable attracting units mounted on said rotary member each for attracting the bottom of one of the can barrels supplied from said supply path means in a first position, each of said attracting units being inactivatable to release said one can barrel onto a conveyor path in a second position after said one can barrel has been rotated by said rotary member through a prescribed angle from said first position to said second position; first rotative drive means for rotating said attracting units; second rotative drive means for intermittently rotating said rotary member; a holder disposed for holding in said first position the can barrels, one at a time, supplied from said supply path means while centrally aligning the bottom of the can barrel with the center of rotation of the attracting unit; said holder including, in said first position below said supply path means, a rotary body having a plurality of recesses defined in an outer periphery thereof each for supporting a side of a can barrel supplied from said supply path means, and third rotative drive means for intermittently rotating said rotary body in synchronism with said rotary member, the radius of a circle along which the can barrels supported by the recesses of said rotary body are rotated by the rotary body being smaller than the radius of a circle along which the can barrels attracted by the attracting units are rotated by said rotary member; and a retarder for stopping the attracting unit against rotation about its own axis when said attracting unit is moved into said first position and attracts the can barrel held by said holder.

Each of said recesses of said rotary body has a leading edge with respect to the direction of rotation of said rotary body, said leading edge being shaped for supporting a side of the can barrel thereon, and a trailing edge with respect to the direction of rotation of said rotary body, said trailing edge being shaped so as to be held out of contact with another side of the can barrel.

The device further comprises an auxiliary receiver for supporting said other side of the can barrel when said leading edge of the recess of the rotary body supports said one side of the can barrel.

The above and other objects, features and advantages of the present invention will become more apparent from the following description when taken in conjunction with the accompanying drawings in which a preferred embodiment of the present invention is shown by way of illustrative example.

DETAILED DESCRIPTION

Figure 1:
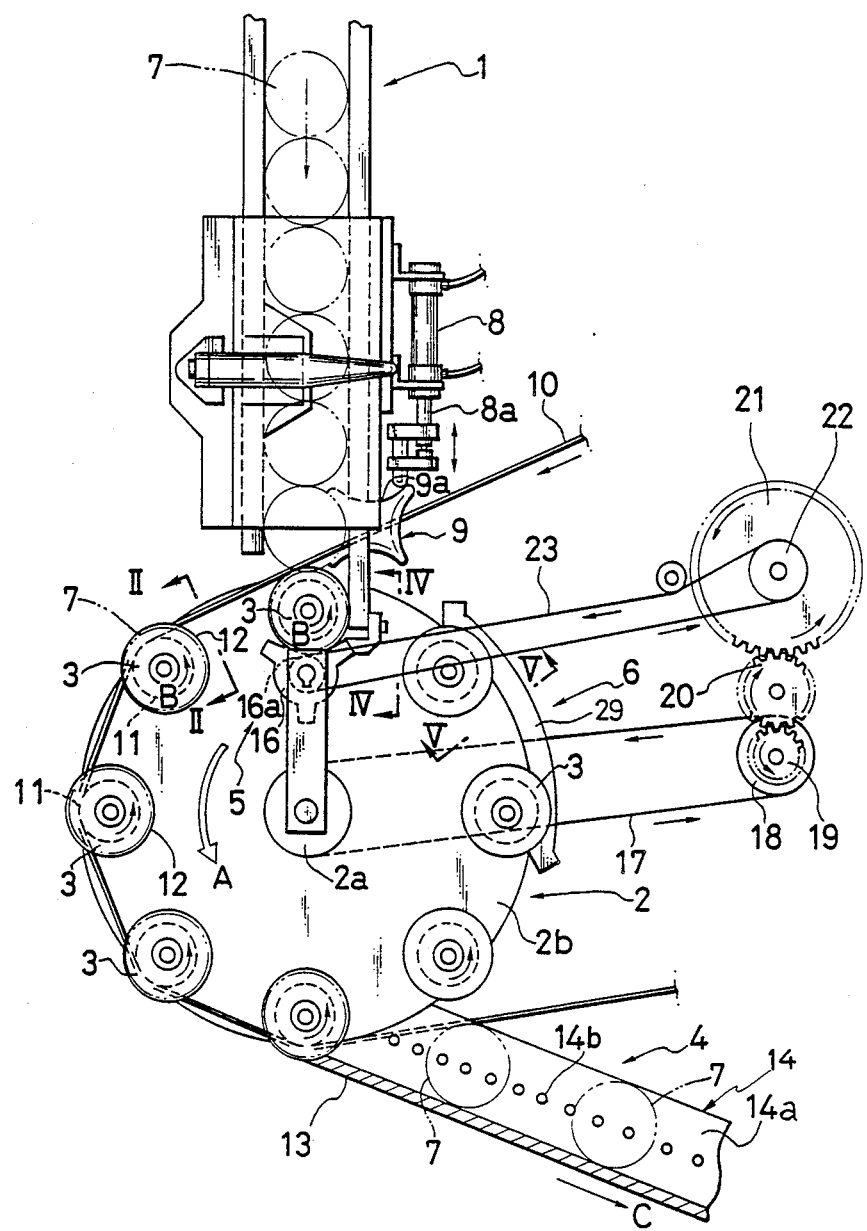
FIG. 1 is a front elevational view of a can barrel feeding device according to the present invention.

FIGS. 1 through 5 show a device for feeding can barrels according to an embodiment of the present invention. The can barrel feeding device generally includes a supply path 1, a rotary disk 2, attracting units 3, a conveyor path 4, a holder 5, and a stopper or retarder 6.

The supply path 1 supplies cylindrical metallic can barrels 7 with bottoms 7a one by one to the holder 5 in a direction normal to sides 7b of the can barrels 7 while holding the axes of the can barrels 7 horizontally. The supply path 1 has a star wheel 9 at its lower terminal end, the star wheel 9 being intermittently rotatable about its own axis in response to extension and retraction of a piston rod 8a of an air cylinder 8 which is disposed on one side of the supply path 1 near the terminal end thereof. The star wheel 9 has a plurality of round recesses 9a defined in the outer periphery thereof at regular angular intervals, the round recesses 9a being of a shape complementary to that of the side 7b of the can barrel 7. When the star wheel 9 is intermittently rotated, the supply path 1 intermittently supplies can barrels 7, one at a time, to the holder 5 in synchronism with the attracting units 3 which are successively brought up to the holder 5 in response to rotation of the rotary disk 2.

The rotary disk 2 is positioned near the terminal end of the supply path 1 and is intermittently rotated about a shaft 2a at a constant speed counterclockwise in the direction of the arrow A. The rotary disk 2 is rotated in synchronism with a rotary body 16 of the holder 5, as described later on.

Figure 2:
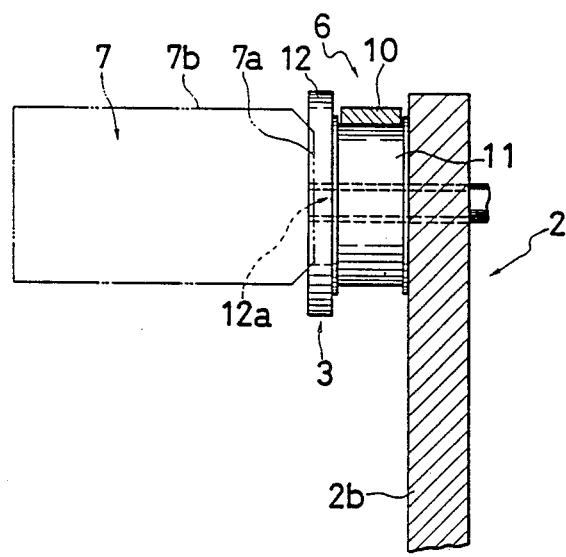
FIG. 2 is an enlarged cross-sectional view taken along line II—II of FIG. 1.
Figure 3:
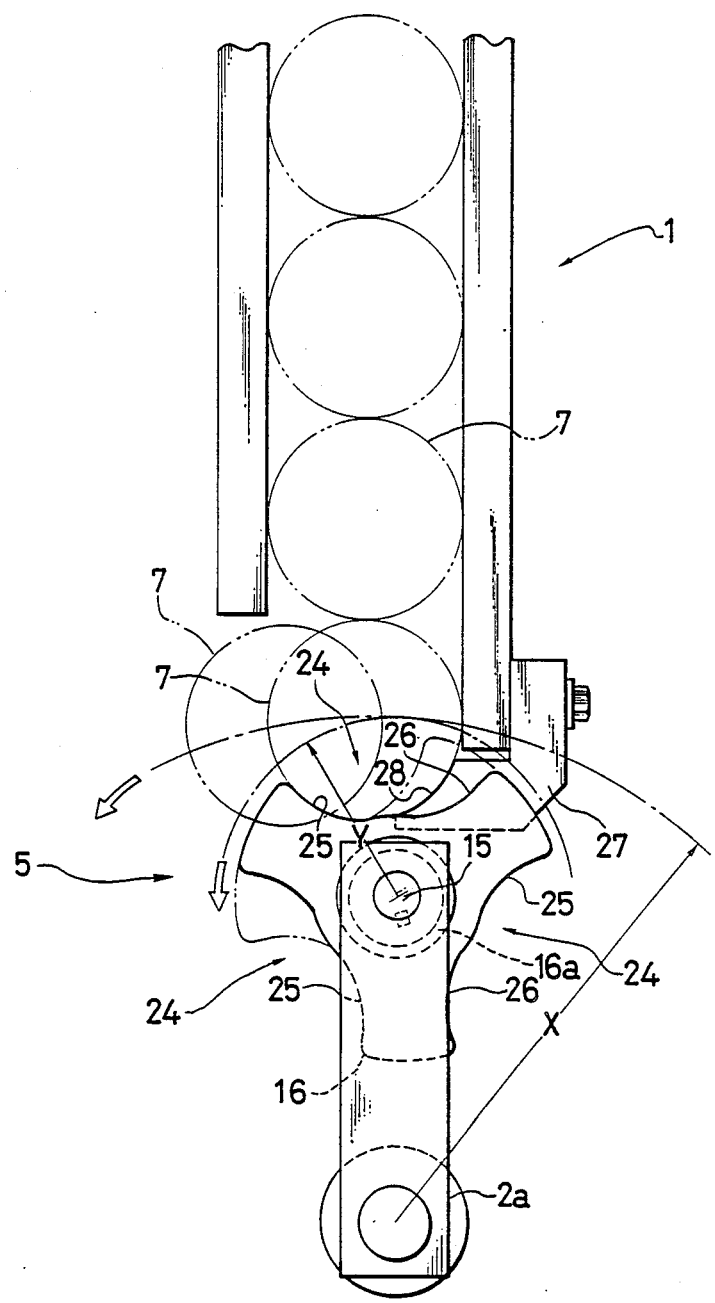
FIG. 3 is a view illustrative of how a can barrel holder operates.
Figure 4:
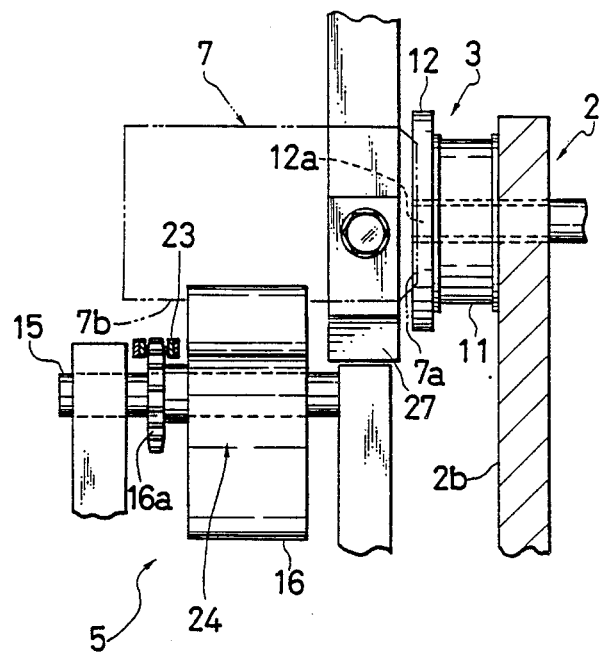
FIG. 4 is an enlarged cross-sectional view taken along line IV—IV of FIG. 1.

The attracting units 3 are disposed on the peripheral edge of a front surface 2b of the rotary disk 2 which lies horizontally, the attracting units 3 being angularly spaced in the circumferential direction of the rotary disk 2. Each of the attracting units 3 attracts the bottom 7a of one can barrel 7 supplied from the supply path 1, holds the can barrel 7 with its axis horizontally, and then rotates the can barrel 7 counterclockwise in the direction of the arrow B. As shown in FIGS. 2 through 4, the attracting unit 3 comprises a rotatable drive roll 11 held against an endless belt 10 trained around the attracting units 3, and an attracting plate 12 disposed on one side of the drive roll 11 remotely from the rotary disk 2 and having a suction hole 12a defined therein at its center of rotation. The drive roll 11 and the attracting plate 12 are rotated in the direction of the arrow B by the belt 10. The bottom 7a of the can barrel 7 is attracted horizontally to the attracting plate 12 under a vacuum applied through the suction hole 12a by a vacuum chamber (not shown) connected to a suction pump located at the back of the rotary disk 2. After the can barrel 7 is angularly moved from the supply path 1 to the conveyor path 4 by the rotary disk 2, the attracting unit 3 releases the can barrel 7 onto the conveyor path 4.

The conveyor path 4 delivers the can barrel 7 released horizontally from the attracting unit 3 in a feeding direction C (FIG. 1). As shown in FIG. 1, the conveyor path 4 comprises a support plate 13 for supporting and guiding the can barrel 7, and an endless belt conveyor 14 having a plurality of equally spaced suction holes 14b defined in a conveyor surface 14a thereof. The conveyor surface 14a extends parallel to the radial direction of the can barrel 7 as it lies horizontally. The bottom 7a of the can barrel 7 is attracted to the conveyor surface 14a under a vacuum applied through the suction hole 14b by a vacuum chamber (not shown) connected to a suction pump located o the back of the conveyor 14, while the can barrel 7 is being fed in the direction of the arrow C by the conveyor 14.

The rotary body 16 of the holder 5 is in the form of a star wheel which is positioned underneath the lower terminal end of the supply path 1, the rotary body 16 being rotatable by a shaft 15. As illustrated in FIG. 3, the radius Y of a circle along which the can barrel 7 rotates while it is being supported in a recess 24 defined in the rotary body 16 is smaller than the radius X of a circle along which the can barrel 7 rotates while it is being attracted by the attracting unit 3. As shown in FIG. 1, an endless chain 17 is trained around the shaft 2a and a driver sprocket 18 which is coupled to a drive motor (not shown). The rotary body 16 is intermittently rotatable in synchronism with the rotary disk 2 by means of a sprocket 16a coupled coaxially to the rotary body 16 and an endless chain 23 which is trained around the sprocket 16a and another sprocket 22 that is secured coaxially to a gear 21 meshing with an idler gear 20 held in mesh with a gear 19 fixed coaxially with the driver sprocket 18.

As shown in FIG. 3, the rotary body 16 has three equally angularly spaced recesses 24 defined in its periphery. Each of the recesses 24 has a leading edge 25 in the direction of rotation thereof, the leading edge 25 being of a curved shape for snugly receiving one can barrel 7 supplied from the supply path 1. The recess 24 also has a trailing edge 26 in the direction of rotation thereof, the trailing edge 26 being shaped so as to be held out of contact with the can barrel 7 when the can barrel 7 is received on the leading edge 25.

An auxiliary receiver 27 is secured to the supply path 1 and has a recess 28 defined therein and positioned beneath the supply path 1. When one side of the can barrel 7 fed from the supply path 1 is supported on the leading edge 25 of one recess 24 in the rotary body 16, the other side of the can barrel 7 is supported by the recess 28 of the auxiliary receiver 27 to prevent the ca barrel 7 from moving in the recess 24.

Figure 5:
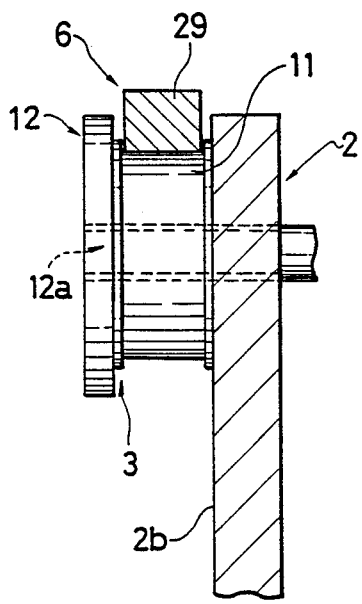
FIG. 5 is an enlarged cross-sectional view taken along line V—V of FIG. 1.
Figure 6:
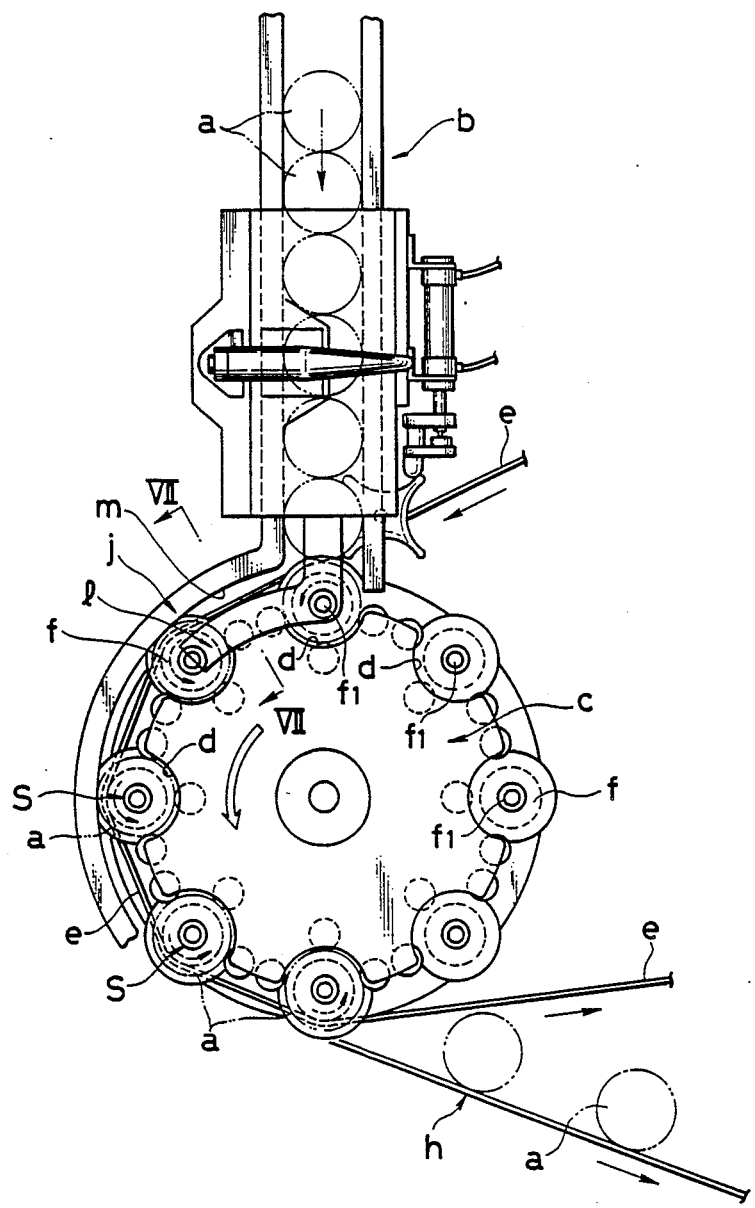
FIG. 6 is a front elevational view of a conventional can barrel feeding device.
Figure 7:
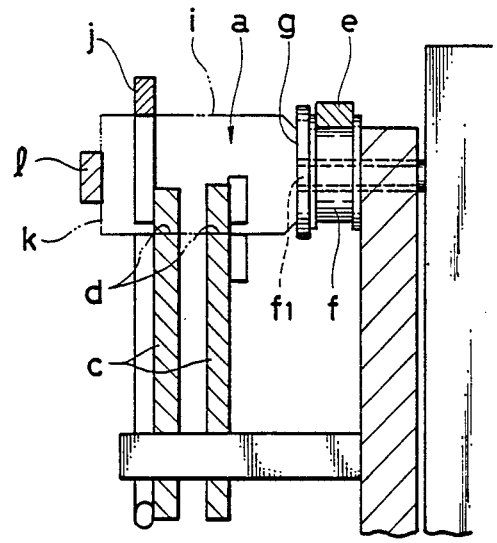
FIG. 7 is an enlarged cross-sectional view taken along line VII—VII of FIG. 6.

The stopper 6 serves to stop the attracting unit 3 against rotation after it has released the can barrel 7. As illustrated in FIGS. 1 and 5, the stopper 6 extends along a passage of movement of the attracting unit 3 after it has released the can barrel 7. The stopper 6 has a stop member 29 which can be pressed against the drive roll 11 of the attracting unit 3. After the attracting unit 3 has released the can barrel 7, the stop member 29 is pressed against the drive roll 11 of the attracting unit 3 which is angularly moved by the rotary disk 2 and which is no longer rotated by the belt 10, for thereby stopping the attracting unit 3 against rotation about its own axis until it attracts a new can barrel 7.

Operation of the can barrel feeding device is as follows: Each time an attracting unit 3 is angularly moved to the holder 5 by the rotary disk 2, a can barrel 7 is intermittently supplied from the supply path 1 by the star wheel 9 to the holder 5 where the can barrel 7 is held horizontally. At this time, the rotary body 16 is angularly positioned with one of its recesses 24 opening upwardly as shown in FIG. 3. The supplied can barrel 7 is kept horizontally with one side thereof supported on the leading edge 25 of the recess 24 and the other side supported in the recess 28 of the auxiliary receiver 27.

When the attracting plate 12 of the attracting unit 3 stopped by the stopper 6 is brought into confronting relation to the bottom 7a of the can barrel 7, a vacuum is applied through the suction hole 12a of the suction plate 12 to attract the bottom 7a of the can barrel 7.

When the can barrel 7 attracted to the attracting unit 3 is turned away from the holder 5 upon rotation of the rotary disk 2, the rotary body 16 is rotated in synchronism with the can barrel 7 to release the can barrel 7.

As illustrated in FIG. 3, the path of angular movement, having the radius Y, of the rotary body 16 carrying the can barrel 7 lies radially inwardly of the path of angular movement, having the radius X, of the attracting unit 3 carrying the can barrel 7. Therefore, the leading edge 25 of the recess 24 which has supported the can barrel 7 is separated very quickly from the can barrel 7, and hence does not interfere with the angular movement of the can barrel 7 which is carried by the attracting unit 3. Moreover, since the trailing edge 26 of the recess 24 is kept out of contact with the can barrel 7, it does not obstruct the angular movement of the can barrel 7 which is effected by the rotary disk 2. The rotary body 16 is further turned counterclockwise until the next recess 24 opens upwardly toward the terminal end of the supply path 1, whereupon the rotary body 16 is stopped in a standby condition for receiving a next can barrel 7 which is supplied from the supply path 1.

The can barrel 7 attracted to the attracting unit 3 is angularly moved in the direction of the arrow A by the rotary disk 2 while the can barrel 7 is being rotated about its own axis by the attracting unit 3. When the rotary disk 2 has turned through a certain angle, the can barrel 7 is released from the attracting unit 3 so that it can be delivered from the rotary disk 2 onto the conveyor path 4.

Since the can barrel 7, after having been held by the holder 5, is attracted to the attracting unit 3 which remains still, the can barrel 7 can concentrically be attracted to the attracting unit 3 in timed relation to the supply of the can barrel 7 from the supply path 1 to the holder 5. The can barrel 7 is not caused to wobble when it is attracted to the attracting unit 3, and hence the side 7b and open end of the can barrel 7 are prevented from being damaged. The bottom 7a of the can barrel 7 can quickly be attracted to the attracting unit 3 which is brought into position by the rotary disk 2.

After the can barrel 7 has been released from the attracting unit 3 and delivered onto the conveyor path 4, the attracting unit 3 is prevented from rotating by the stopper 6. Accordingly, the attracting unit 3 as it is stopped against rotation can confront the bottom 7a of a next can barrel 7 which has been held horizontally by the holder 5. Thus, the attracting unit 3 can quickly and reliably attract the bottom 7a of the next can barrel 7.

While in the illustrated embodiment the ca barrel 7 is attracted by the attracting unit 3 under a vacuum, it may be magnetically attracted by an electromagnet device disposed on the back of the attracting unit 3 insofar as the can barrel 7 is made of a steel material such as tin plate or tin-free steel.

With the present invention, after a can barrel has been supplied from the supply path, it is held horizontally by the holder with the bottom of the can barrel being centrally aligned with the center of rotation of the attracting unit. Thereafter, the can barrel is attracted to the attracting unit which has been stopped by the stopper against rotation about its own axis. Consequently, the can barrel can be attracted to the attracting unit reliably in timed relation to the supply of the can barrel from the supply path to the rotary disk without damaging the ca barrel. The can barrel feeding device is simple in structure as it does not require a star wheel for rotating can barrels, a side guide for engaging can barrels, and a top guide for engaging the open ends of can barrels.

Although certain preferred embodiment has been shown and described, it should be understood that many changes and modifications may be made therein without departing from the scope of the appended claims.

What is claimed is:

1. A device for feeding can barrels, comprising:
   a rotary member rotatable about its own axis;
   supply path means for supplying can barrels to said rotary member;
   a plurality of rotatable attracting units mounted on said rotary member each for attracting the bottom of one of the can barrels supplied from said supply path means in a first position, each of said attracting units being inactivatable to release said one can barrel onto a conveyor path in a second position after said one can barrel has been rotated by said rotary member through a prescribed angle from said first position to said second position;
   first rotative drive means for rotating said attracting units about their own axes;
   second rotative drive means for intermittently rotating said rotary member;
   a holder disposed in said first position for holding the can barrels, one at a time, supplied from said supply path means while centrally aligning the bottom of the can barrel with the center of rotation of the attracting unit;
   said holder including, in said first position below said supply path means, a rotary body having a plurality of recesses defined in an outer periphery thereof each for supporting a side of a can barrel supplied from said supply means, the axis of rotation of the rotary body being above the axis of rotation of the rotary member and below the axis of rotation of an attracting unit positioned in said first position, and third rotative drive means for intermittently rotating said rotary body in synchronism with said rotary member to rotate the can barrels about the axis of the rotary member, the radius of a circle along which the can barrels supported by the recesses of said rotary body are rotated by the rotary body being smaller than the radius of a circle along which the can barrels attracted by the attracting units are rotated by said rotary member; and a retarder for stopping the attracting unit against rotation about its own axis when said attracting unit is moved into said first position and attracts the can barrel held by said holder.

2. A device according to claim 1, wherein each of said recesses of said rotary body has a leading edge with respect to the direction of rotation of said rotary body, said leading edge being shaped for supporting a side of the can barrel thereon, and a trailing edge with respect to the direction of rotation of said rotary body, said trailing edge being shaped so as to be held out of contact with another side of the can barrel.

3. A device according to claim 2, further comprising an auxiliary receiver for supporting said other side of the can barrel when said leading edge of the recess of the rotary body supports said one side of the can barrel.

* * * * *